D. T. SHARPLES.
METHOD OF MILKING.
APPLICATION FILED JAN. 11, 1910.
992,072.
Patented May 9, 1911.
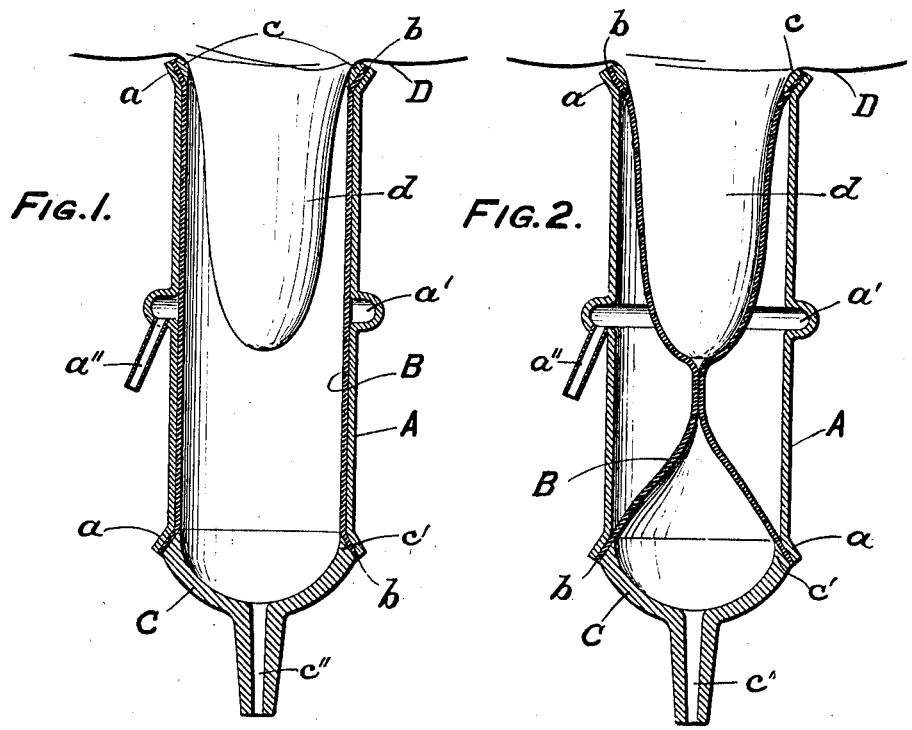

UNITED STATES PATENT OFFICE.

DAVID TOWNSEND SHARPLES, OF WEST CHESTER, PENNSYLVANIA.

METHOD OF MILKING.

992,072.  Specification of Letters Patent.  Patented May 9, 1911.

Application filed January 11, 1910. Serial No. 537,449.

*To all whom it may concern:*

Be it known that I, DAVID T. SHARPLES, a citizen of the United States, residing at West Chester, in the county of Chester and State of Pennsylvania, have invented a new and useful Method of Milking, of which the following is a specification.

My invention is a method of milking whereby the teats of the cow are subjected to suction and pressure to effect respectively the evacuation of the milk and the restoration of the tissues, organs and fluids of the teats and udder to their normal conditions, the teats being manipulated incidentally so as to excite the nerves and stimulate the flow of milk.

In the operations of milking apparatus heretofore employed, it has been usual to subject the teats of the animal to pulsating mechanical and pneumatic actions for the purpose of pressing out and drawing out the milk, but in these operations a continuous downward strain, though of varying intensity, is exerted, which results injuriously, since many cows subjected thereto are irritated, have inflamed and congested teats, hold up their milk and have their normal periods of lactation shortened.

It is a primary object of my invention to effect the free evacuation of the milk without irritation or injury, with avoidance of the constant tension or pulling action which interferes with the normal functions as those of the blood and milk vesicles.

By my method the teat is subjected to suction, and to intermittent pressure exerted over substantially the entire surface previously subjected to suction, the pressure being obtained preferably by pneumatically collapsing a flexible tube upon the teat in alternation with the application of suction thereto.

In practice I have obtained highly satisfactory results by subjecting the teat to suction due to a fourteen inch vacuum applied within a flexible tube, subject externally to a sixteen inch vacuum alternating with pressure above that of the atmosphere of about four pounds to the square inch. But the suction and the pressure are subject to regulation, both as to their force and time, to accommodate the action to the milking characteristics of cows. The desired effect may be attained with the suction in the tube either continuous or intermittent, because the varying exterior pressures regulate the interior suction in its application to the teat. The periodic pressure is exerted along the teat, or so much thereof as is subjected to suction, and is applied to points along the teat either simultaneously or from the end progressively upward, so that the tissues, vesicles and related parts are periodically relieved from the tension or downward pull which withdraws the milk and a restoration of conditions is produced periodically. The resulting effects are agreeable to the animal, the milk is let down freely and, after milking, the teats are in the same relaxed and flabby condition found after the suckling of a calf.

The characteristic operations of my method may be illustrated by the apparatus shown in the accompanying drawings, in which—

Figures 1 and 2 are longitudinal sectional views representing two operating relations of a teat cup which I have devised for the practice of my method.

This apparatus comprises the comparatively rigid outer tube or shell A having flared ends $a$ and the peripheral channel $a'$ intermediate of the ends, the channel having the duct $a''$ connected therewith. An elastic inner tube B has the material of its open ends $b$ pressed tightly against the inner surfaces of the shell's ends $a$, at the top by the tapered ring $c$ and at the bottom by the tapered ring $c'$ of the base C, the rings conforming to the interior surfaces of the shell's ends within which they are wedged. The base C is provided with a duct $c''$ which communicates with the interior of the inner tube B. The ring $c$ is adapted to be passed upon the teat $d$ into contact with the body D of the udder, where it may be held by exhausting the air from the inner tube B through the duct $c''$.

A vacuum is created within the inner tube B by suction through the duct $c''$, which is accompanied by sufficient suction through the duct $a''$ to keep the inner tube expanded, and milk collected in the teat is discharged therefrom. At the end of the interval during which the discharge of milk held in the teat has taken place, the tube B is collapsed and pressed against the teat by increasing the pressure between the parts A and B, the preferable pressure thus caused to act upon the teat being greater than that of the atmosphere, say a pressure of four pounds above that of the atmosphere. The tissues having been restored to their normal condition, or pressed back by the external force applied thereto, for the instant during which the teat is relieved of the tension or suction that effects the expulsion of the milk, the blood and milk vesicles are restored to their normal conditions and functions for the interval, at the end of which a further impulse effects the evacuation of further milk collected from the milk ducts. These impulses, subjecting the teat alternately to suction and pressure, are varied in time and degree as conditions require.

It will be understood that the flexible inner tube, preferably made of thin and elastic rubber, provides a sheath for inclosing the teat and that the resultant pressure to which this sheath is subjected is periodically reversed so as to cause it to expand during the interval required for drawing milk and to collapse upon the teat so as to relieve the latter from the effect of the vacuum during the interval required for pressing back the tissues, whereby the method is distinguished from the natural operation in which suction and pressure, from the root of the teat downwardly, are simultaneously applied in alternation with periodic relaxation of such suction and pressure.

Having described my invention, I claim:—

1. The method of milking which consists in subjecting the teat to suction and intermittently applying pressure thereto so as to restore the tissues to approximately normal condition.

2. The method of milking which consists in subjecting the teat to suction and alternately therewith applying pressure thereto inwardly and upwardly.

3. The method of milking which consists in subjecting the teat alternately to suction sufficient to effect the discharge of milk and pressure higher than atmospheric applied over substantially the surface subjected to suction.

4. The method of milking which consists in inclosing the teat in a flexible sheath, reducing the normal exterior and interior pressure on said sheath so as to effect the discharge of milk from the teat, and pneumatically pressing said sheath against said teat so as to restore substantially normal conditions therein.

5. The method of milking which consists in inclosing the teat in a flexible sheath, reducing the pressure within said sheath so as to effect the discharge of milk from the teat, and intermittently collapsing said sheath upon said teat so as to press the tissues inwardly and upwardly.

6. The method of milking which consists in subjecting the teat to artificial suction and intermittently pressing the same by fluid pressure so as to restore the tissues distorted by suction.

7. The method of milking which consists in inclosing the teat by means including a flexible device, reducing the normal pressure within and without said device so as to effect the discharge of milk from the teat, and applying fluid pressure to said device and thereby pressing said teat so as to restore substantially normal conditions therein.

In witness whereof I have hereunto set my name this 10th day of January 1910, in the presence of the subscribing witnesses.

DAVID TOWNSEND SHARPLES.

Witnesses:
A. C. MACARTNEY,
H. B. CARLISLE.